United States Patent
Wang et al.

[11] Patent Number: 6,125,708
[45] Date of Patent: Oct. 3, 2000

[54] QUICK INSTALLING AXIAL DEFORMATION TRANSDUCER

[75] Inventors: Jerry Zhiqi Wang, Canton; Pierre Joseph Gosselin, Dearborn; Jonathan Edward Gunger, Canton, all of Mich.

[73] Assignee: Ford Global Technologies, Inc., Dearborn, Mich.

[21] Appl. No.: 09/245,036

[22] Filed: Feb. 5, 1999

[51] Int. Cl.⁷ .................................................. G01L 5/12
[52] U.S. Cl. ........................................................ 73/862.49
[58] Field of Search .............................. 73/760, 763, 769, 73/772, 781, 788, 789, 862.041, 862.042, 862.043, 862.044, 862.045, 862.381, 862.49

[56] References Cited

U.S. PATENT DOCUMENTS

| | | |
|---|---|---|
| 2,154,280 | 4/1939 | Nadai et al. .................................. 265/2 |
| 2,416,664 | 2/1947 | Ruge ............................................ 201/63 |
| 3,599,479 | 8/1971 | Kutsay ...................................... 73/88.5 R |
| 3,914,991 | 10/1975 | Fletcher et al. ......................... 73/88.5 R |
| 4,064,744 | 12/1977 | Kistler ..................................... 73/88.5 R |
| 4,223,443 | 9/1980 | Bachmann et al. ...................... 33/148 D |
| 4,464,937 | 8/1984 | Watts et al. ................................. 73/772 |
| 4,911,004 | 3/1990 | Leon ..................................... 73/862.49 |
| 5,099,700 | 3/1992 | Morin et al. .......................... 73/862.04 |
| 5,190,116 | 3/1993 | Reichow ................................... 177/211 |

*Primary Examiner*—William Oen
*Attorney, Agent, or Firm*—Gregory P. Brown

[57] ABSTRACT

A quick installing axial deformation transducer has diametrically opposite strain gages to measure the axial deformation or load on a uniform or tapered cross-section member. The strain gages are four in number with two on each diametrically side of the member. Adjacent strain gages are orientated and electrically connected on adjacent arms of a bridge to measure axial deformation and to cancel outputs caused by bending or torsional moments as a result of the axial force applied.

13 Claims, 2 Drawing Sheets

QUICK INSTALLING AXIAL DEFORMATION TRANSDUCER

BACKGROUND OF THE INVENTION

1. Field of the Invention

This invention relates to load transducers in general and more particularly to transducers that are releasably mounted to load bearing members.

2. Description of the Related Art

U.S. Pat. No. 5,190,116 issued to Reichow describes a deflection transducer that has its mounting supports fixedly attached to the member to measured and the transducer is secured thereto by releasably means.

U.S. Pat. No. 5,099,700 issued to Morin et al. shows a sensor clamped to a drilling element. The clamps are attached to the drilling element and the connecting elements between the clamps produce a tension zone formed by parallel members. Blades and gages measure the torsion at the tension zone.

U.S. Pat. No. 4,464,937 issued to Watts et al. employs clamps to which arms are attached. The arms produce a strain at a flexure.

U.S. Pat. No. 4,223,443 issued to Bachmann et al. employs clamps for attachment to a specimen. Wire strain gages are formed between the limbs.

U.S. Pat. No. 4,064,744 issued to Kistler shows a strain sensor for attachment to a member. The sensor includes a flexible beam, strain gages and bridges.

U.S. Pat. No. 2,416,664 issued to Ruge discloses a strain sensor with flexible strain gages clamped to a specimen.

U.S. Pat. Nos. 3,914,991 and 3,599,479 issued to Fletcher et al. and Kutsay respectively, are examples of strain gages that are clamped to a member at two different locations and employ strain gages between the clamped portions.

U.S. Pat. No. 2,154,280 issued to Nadai et al. employs parallel rods. An indicator measures displacement.

SUMMARY OF THE INVENTION

It a principal advantage of the quick-installing axial deformation transducer of the present invention to be a rugged deformation transducer that is responsive only to axial tensile and compressive deformation. Outputs caused by other axis deformations can be eliminated by the symmetry of the transducer and strain gage orientation.

An axial deformation transducer has a first clamping assembly with first and second spaced-part semicircular clamping collars with flanges extending outward therefrom along the open diameter. A first pushing pillar extends from the first collar in an axial direction toward the second collar. A second pushing pillar extends from the second collar in an axial direction toward the first collar. A first sensing platform extends orthogonal to and between the first and second pillars and at the end of each pillar forming an integral first clamping structure. A second clamping structure is similarly fabricated.

The first and second clamping structures are secured together by fastening means extending through one of the flanges and secured in the other flange. First and second strain gages are connected to the first sensing platform and a third and fourth strain gages are connected to the second sensing platform.

The strain gages are electrically connecting in circuit in a bridge for measuring the electrical changes in each gage in response to axial movement relative to the member being measured of the pushing pillars. Securing means extending through each of the four collars are used for securing the first and second clamping assemblies around a cross section of the member to be measured forming an axial deformation transducer.

BRIEF DESCRIPTION OF THE DRAWINGS

These and other advantages of the quick-installing axial deformation transducer are illustrated in the following drawings wherein.

DETAILED DESCRIPTION OF THE PREFERRED EMBODIMENT

Figure 1:
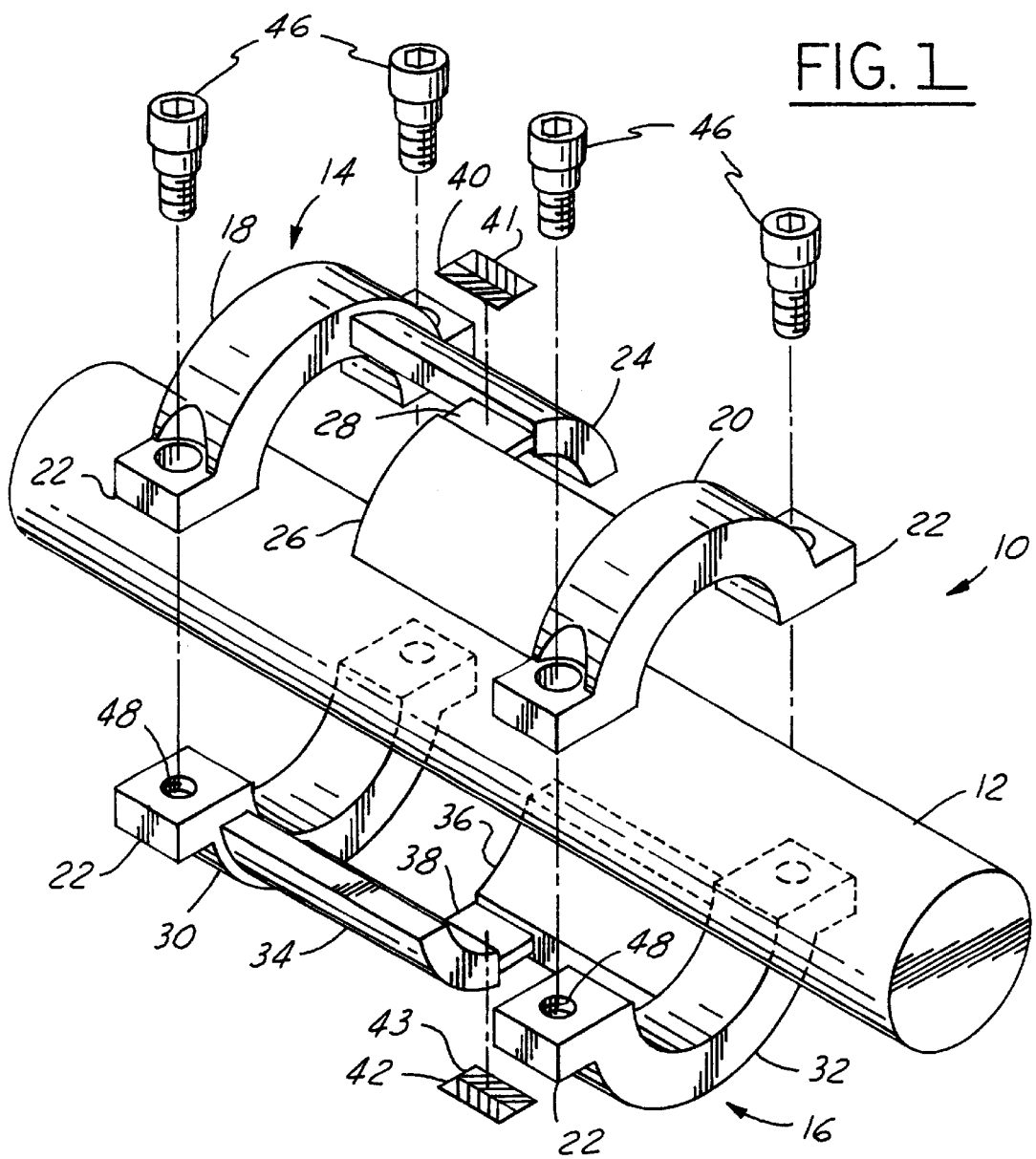
FIG. 1 is an exploded isometric view of the transducer.

Referring to Figs by the characters of reference there is illustrated in FIG. 1 an axial deformation transducer 10 that is releasably mounted to a load-bearing member 12. One of the many uses of the axial deformation transducer 10 is to measure the deformation of a member or part 12 such as tie rods in a motor vehicle. The features of the transducer, to be hereinafter described, permit the transducer to be easily and readily attached and removed from the tie rod. This is without any modification of the tie rod. This is possible because the transducer has a pair of integral clamping assemblies 14, 16 secured together and to the member 12 to be measured.

A first clamping assembly 14 has both a first 18 and second 20 spaced-apart semicircular clamping collars. Each collar has flanges 22 extending outward therefrom along the open diameter. A first pushing pillar 24 extends from the first collar 18 in an axial direction toward the second collar 20. A second pushing pillar 26 extends from the second collar 20 in an axial direction toward the first collar 18. A first sensing platform 28 extends orthogonal to and between the first 24 and second 26 pillars and at the end of each pillar to form an integral structure.

A second clamping assembly 16 has a third 30 and fourth 32 spaced-apart semicircular clamping collars. Each collar has flanges 22 extending outward therefrom along the open diameter. A third pushing pillar 34 extends from the third collar 30 in an axial direction toward the fourth collar 32. A fourth pushing pillar 36 extends from the fourth collar 32 in an axial direction toward the third collar 30. A second sensing platform 38 extends orthogonal to and between the third 34 and fourth 36 pillars and at the end of each pillar to form an integral structure. The axial deformation of the member to be measured 12 is transferred to the sensing platforms 28, 38 and the strain gages 40–43 mounted thereon by the pushing pillars attached to each sensing platform.

Figure 4:
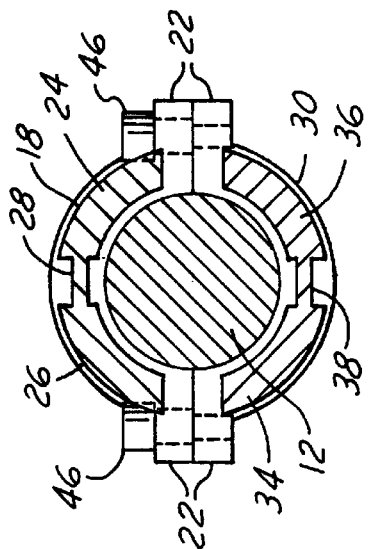
FIG. 4 is a sectional view taken along line 4—4 of FIG. 2.

Referring to FIG. 4, the cross-section dimension of the sensing platforms 28, 38 is much thinner than the cross section of the pushing pillars. The significantly larger cross-section of the pillars creates a greater stiffness of the pillars. This guarantees that the strain gages mounted on the sensing platforms 28, 38 will sense a higher percentage of the deformation of the member to be measured 12. Likewise the higher stiffness of the pushing pillars ensures that the transducer 10 will have low sensitivity to vehicle vibration when the transducer 10 is mounted in a vehicle.

Figure 5:
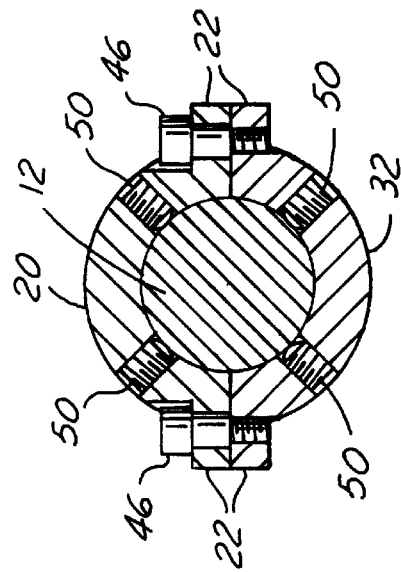
FIG. 5 is a sectional view taken along line 5—5 of FIG. 2.
Figure 2:
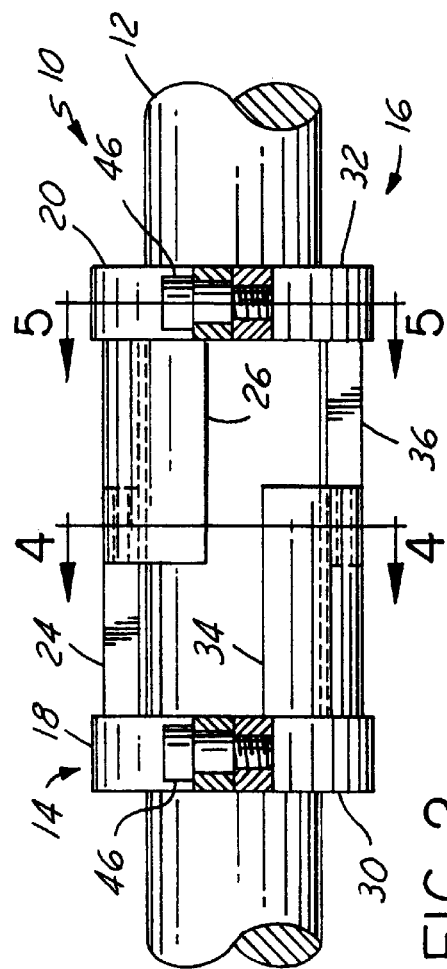
FIG. 2 is a plan view of the transducer of FIG. 1.
Figure 3:
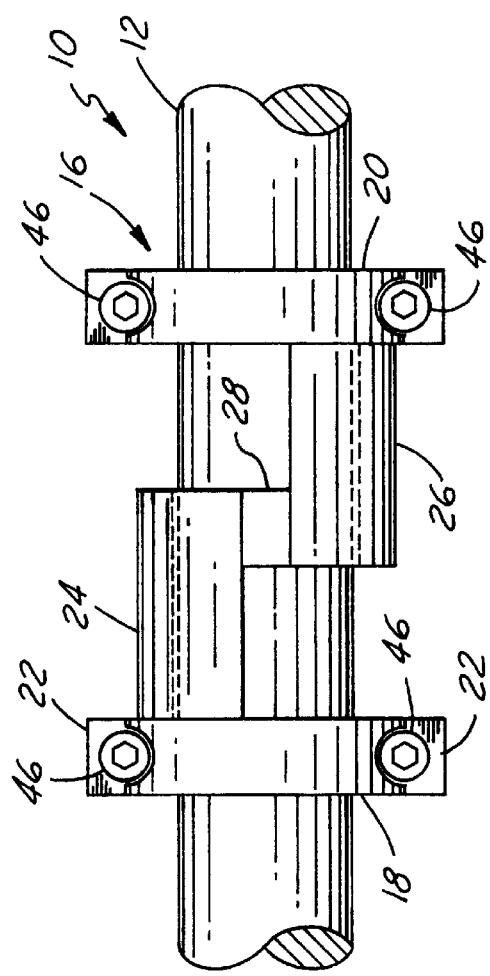
FIG. 3 is a side view of the transducer of FIG. 2.

As illustrated in FIG. 5, extending through each of the flanges 22 extending outwardly from the first 18 and second 20 collars are fastening means 46 such as threaded members or bolts. Opposite the bolt holes for the bolts are threaded hole 48 for receiving the bolts to secure the first 14 and second 16 clamping assembly structures together. Of course it is understood that any form of fastening means can be used so long as the clamping assemblies are secured together and around the member to be measured 12.

Mounted on the first sensing platform 28 are first 40 and second 41 strain gages. In a similar manner third 42 and fourth 43 strain gages are mounted on the second sensing platform 38. The mounting of the strain gages is by techniques that are well known in the art. As illustrated in FIG. 1, the strain gages are mounted in a herribone or chevron pattern to measure shear deformation on the sensing platforms 28, 38. By symmetrically mounting the strain gages on each sensing platform both outputs caused by bending and torsional moments are canceled when axial force is applied to the member 12 to be measured.

Figure 6:
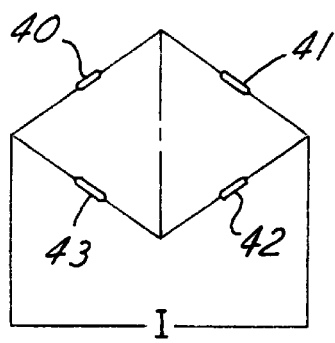
FIG. 6 is a bridge circuit for use with the transducer of FIG. 1.

The first 40, second 41, third 42 and fourth 43 strain gages are electrically connected in a circuit means and more particularly in a bridge for measuring the electrical changes in each gage in response to an axial movement of the pushing pillars. As illustrated in FIG. 6 in order to cancel the bending and torsional moments that maybe created by the axial force on the member to be measured, the first 40 and second 41 strain gages are electrically connected to adjacent arms of the bridge. In a similar manner, the third 42 and fourth 43 strain gages are likewise electrically connected to adjacent arms of the bridge.

Securing means 50, such as setscrews, extend through each of the first, second, third and fourth collars to secure the first 14 and second 16 clamping assemblies around a circular cross section of the member 12 to be measured forming an axial deformation transducer 10. As illustrated, in FIG. 5, the setscrews 50 are spaced diametrically opposite each other. The function of the securing means 50 is create an interference fit between the clamping assemblies 14, 16 and the member 12 to be measured. In this manner the transducer 10 will axially move, and will not slip, as a result of the force applied to the member 12 to be measured.

Referring to FIG. 4, the sensing platforms 28, 38 are mounted in such a manner as to be diametrically opposite, spaced one hundred eighty degrees apart, from each other. Changing the transducer effective total length, that is the distance between the first 18 and second 20 collars and the third 30 and fourth 32 collars, can optimize the output of the transducer. In addition by changing the width of the sensing platforms 28, 38 in the circumferential direction as illustrated in FIG. 4 will also change the sensitivity of the transducer. As an example if the length is increased and the width of the sensing platforms is decreased, the transducer output can be increased over a shorter length and increased width.

As illustrated in FIG. 5, the inner diameter of each of the semicircular collars 20, 32 is greater than the cross sectional diameter of the member 12 to be measured. It is to be noted that the cross-sectional diameter of the member 12 to be measured can be a uniform or a tapered diameter.

The transducer 10 of FIG. 1 can be used to measure the axial force applied to a member 12 having a cross sectional diameter by the steps of the following method. First form a first clamping assembly 14 having a pair of end collars 18, 20 with a semi-circular inner diameter greater than the outer diameter of the member to be measured.

Then form a cantilevered first pillar 24 extending from the first collar 18 in the direction of the second collar 20 and form a cantilevered a second pillar 26 extending from the second collar 20 in the direction of the first collar 18.

Join the open ends of the first 24 and second 26 pillars with a sensing platform 28 having a cross sectional area substantially less than the cross sectional area of the pillars. On the sensing platform mount a first 40 and second 41 strain gages orientated to sense shear deformation in a herringbone or chevron pattern wherein the length of the strain gages extends in a direction parallel to the pillars.

Then form a second clamping assembly 16 substantially identical to the first clamping member 14. Mounting the first 14 and second 16 clamping assemblies around the member 12 to be measured in a manner so that the sensing platforms 28, 38 are diametrically opposite and parallel to each other.

Secure the first 14 and second 16 clamping assemblies to each other by means of fasteners 46 such as bolts extending through the flanges 22 of one collar 18, 20 and into the threaded bolt holes 48 in the other collar 30, 32 directly opposite.

Once the clamping members are secured together then securing the first 14 and second 16 clamping assemblies to the member 12 to be measured in an interference fit by securing means 50 such as setscrews that "bite" into the member 12 to be measured. By forming an interference fit, the pillars 24, 26, 34, 36 move in a direction parallel to the axis of the member 12 proportional to the amount of force being axially applied.

Then electrically connect each of the strain gages 40–43 in a bridge network wherein the output of the bridge network is an electrical signal representing the amount of force being axially applied to the member 12 to be measured.

The step of mounting first 40 and second 41 strain gages for canceling outputs caused by bending and torsional moments is by electrically connecting the adjacent strain gages on each sensing platform 28 to adjacent arms of the bridge. In addition by symmetrically mounting the strain gages on each sensing platform cancels the outputs caused by bending or torsional moments on the member.

The method and the transducer will function on a circular cross-section member as well as a tapered member.

There has thus been shown and described an axial deformation transducer 10 that is quick installing on members 12 such as motor vehicle tie rods. The transducer 10 is designed to measure the axial deformation or load of the tie rod and to minimize outputs caused by other deformation or load. The sensing platforms 28, 38 can be designed to have more deformation than the axial deformation of the member 12 to be measured. The member must be a uniform part of various cross-sections such as circular, tapered, etc.

What is claimed is:

1. An axial deformation transducer comprising:

a first clamping assembly having a first and second spaced apart clamping semicircular collars with flanges extending outward therefrom along the open diameter, a first pushing pillar extending from said first collar in an axial direction toward said second collar, a second pushing pillar extending from said second collar in an axial direction toward said first collar and a first sensing platform extending orthogonal to and between said first and second pillars and at the end of each pillar forming an integral structure;

a second clamping assembly having a third and fourth spaced apart clamping semicircular collars with flanges extending outward therefrom along the open diameter, a third pushing pillar extending from said third collar in an axial direction toward said fourth collar, a fourth pushing pillar extending from said fourth collar in an axial direction toward said third collar and a second sensing platform extending orthogonal to and between said third and fourth pillars and at the end of each pillar forming an integral structure;

fastening means extending through each of said flanges for securing said first and second clamping assembly together;

a first and second strain gage connected to said first sensing platform and a third and fourth strain gage connected to said second sensing platform;

circuit means for electrically connecting said first, second, third and fourth strain gages in a bridge for measuring the electrical changes in each gage in response to axial movement of said pushing pillars; and means extending through each of said first, second, third and fourth collars for securing said first and second clamping assemblies around a circular cross section of the member to be measured forming an axial deformation transducer.

2. An axial deformation transducer according to claim 1 wherein said first and second strain gages are mounted in a herringbone pattern to measure shear deformation on said first sensing platform.

3. An axial deformation transducer according to claim 1 wherein said third and fourth strain gages are mounted in a herringbone pattern to measure shear deformation on said second sensing platform.

4. An axial deformation transducer according to claim 1 wherein said means extending through each of said first, second, third and fourth collars are setscrews to secure said clamping assembles in an interference fit with the member.

5. An axial deformation transducer according to claim 1 wherein said first and second sensing platforms have a thinner cross-section than the cross section of said first, second, third and fourth pillars respectively.

6. An axial deformation transducer according to claim 1 wherein said first sensing platform is 180 degrees from said second sensing platform.

7. An axial deformation transducer according to claim 1 wherein the inner diameter of each of said semicircular collars is greater than the cross sectional diameter of the member to be measured.

8. A method of measuring the axial force applied to a member having a cross sectional diameter comprising the steps of:

forming a first clamping member having a pair of end collars with a semi-circular inner diameter greater than the outer diameter of the member to be measured;

cantileverly forming a first pillar extending from the first collar in the direction of the second collar;

cantileverly forming a second pillar extending from the second collar in the direction of the first collar;

joining the open ends of the first and second pillars with a sensing platform having a cross sectional area substantially less than the cross sectional area of the pillars;

mounting a first and second strain gages to the sensing platform orientated to sense shear deformation;

forming a second clamping member substantially identical to the first clamping member;

mounting the first and second clamping members around the member to be measured in a manner so that the sensing platforms are diametrically opposite and parallel to each other;

securing said first and second clamping members to each other by means of fasteners;

securing the first and second clamping members to the member to be measured in an interference fit; and then electrically connecting each of the strain gages in a bridge network wherein the output of the bridge network is an electrical signal representing the amount of force being axially applied to the member to be measured.

9. A method of measuring the axial force according to claim 8 wherein the member to be measured has a uniform cross sectional diameter.

10. A method of measuring the axial force according to claim 8 wherein the member to be measured has a uniform tapered cross sectional diameter.

11. A method of measuring the axial force according to claim 8 wherein the step of mounting first and second strain gages for canceling the bending and torsional moments is by electrically connecting the adjacent strain gages on each sensing platform to adjacent arms of the bridge.

12. A method of measuring the axial force according to claim 8 wherein the step of mounting first and second strain gages for canceling outputs caused by the bending and torsional moments is by symmetrically mounting the strain gages on each sensing platform.

13. A method of measuring the axial force according to claim 8 wherein the step of securing the clamping members to the member to be measured is by threading at least a pair of fasteners through each collar and into the surface of such member forming an interference fit whereby the pillars move in a direction parallel to the axis of such member proportional to the amount of force being axially applied.

* * * * *